(12) United States Patent
Elliott

(10) Patent No.: US 7,364,202 B1
(45) Date of Patent: Apr. 29, 2008

(54) ADJUSTABLE PIPE REPAIR CLAMP INSTALLATION TOOL

(75) Inventor: Jerry E. Elliott, Aurora, IL (US)

(73) Assignee: Cascade Waterworks Manufacturing Co., Inc., Yorkville, IL (US)

( * ) Notice: Subject to any disclaimer, the term of this patent is extended or adjusted under 35 U.S.C. 154(b) by 0 days.

(21) Appl. No.: 10/701,219

(22) Filed: Nov. 4, 2003

Related U.S. Application Data

(63) Continuation-in-part of application No. 10/608,290, filed on Jun. 27, 2003, which is a continuation-in-part of application No. 10/393,820, filed on Mar. 21, 2003, now Pat. No. 6,837,522.

(51) Int. Cl.
*F16L 35/00* (2006.01)

(52) U.S. Cl. .......................... 285/39; 81/486; 269/228

(58) Field of Classification Search .................. 285/15, 285/312, 39, 33, 26, 29; 24/270; 292/113, 292/247
See application file for complete search history.

(56) References Cited

U.S. PATENT DOCUMENTS

| 1,445,286 | A | * | 2/1923 | Bosco | ............................ 24/21 |
| 1,619,749 | A | * | 3/1927 | Murray | ........................ 269/209 |
| 1,885,128 | A | * | 11/1932 | Montgomery | ................ 24/270 |

* cited by examiner

*Primary Examiner*—Aaron Dunwoody
(74) *Attorney, Agent, or Firm*—Wildman, Harrold, Allen & Dixon LLP

(57) ABSTRACT

A manually operated tool engages and draws towards one another opposed spaced flanges of a repair clamp disposed about a leaking pipe for moving the clamp into position and securely maintaining the clamp on the pipe over the leak allowing plural nut and bolt combinations on the clamp to be tightened in sealing off the leak. A movable handle has attached thereto first and second pivoting arms adapted for respectively engaging a slot within the clamp's first edge flange and the outer edge of the clamp's second opposed edge flange when the handle is in a first non-use position. Moving the handle to a second use position urges the clamp's edge flanges toward one another drawing the clamp securely about the pipe, allowing the clamp's nut and bolt combinations to be tightened. The tool is adjustable for use with a wide range of clamp sizes and pipe diameters.

19 Claims, 5 Drawing Sheets

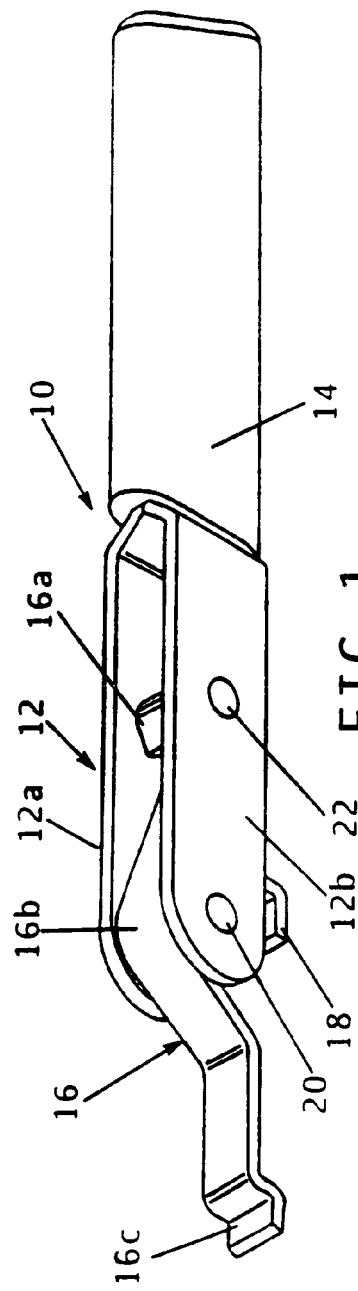
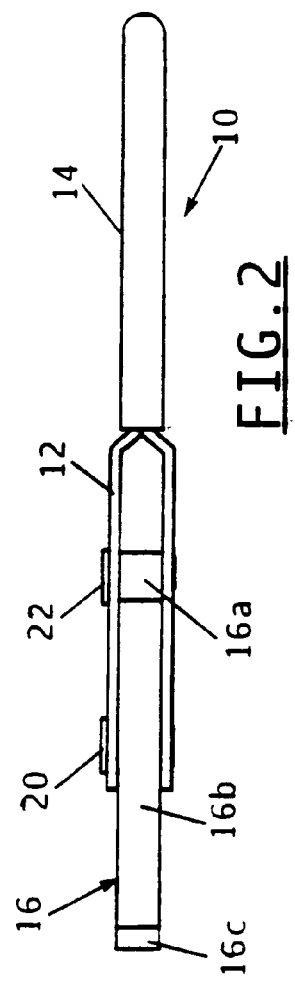
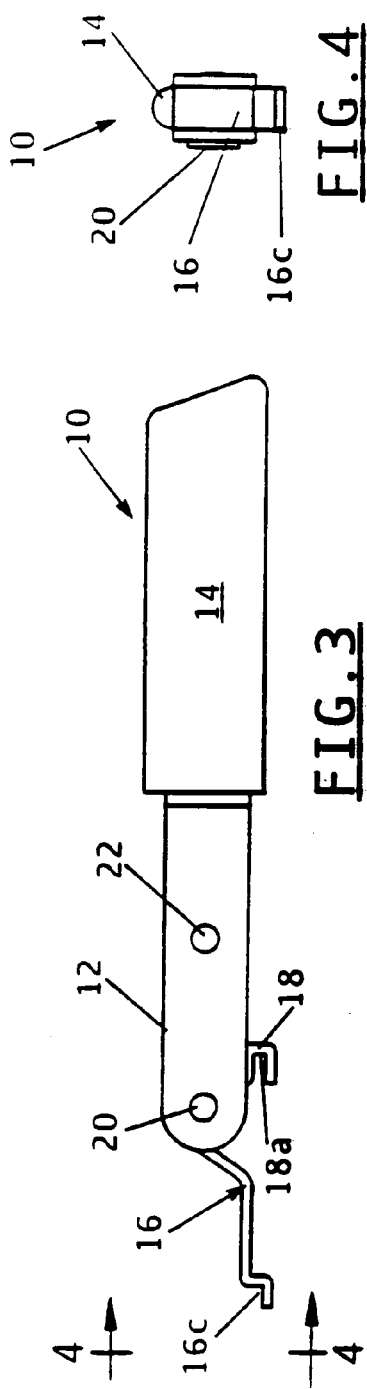

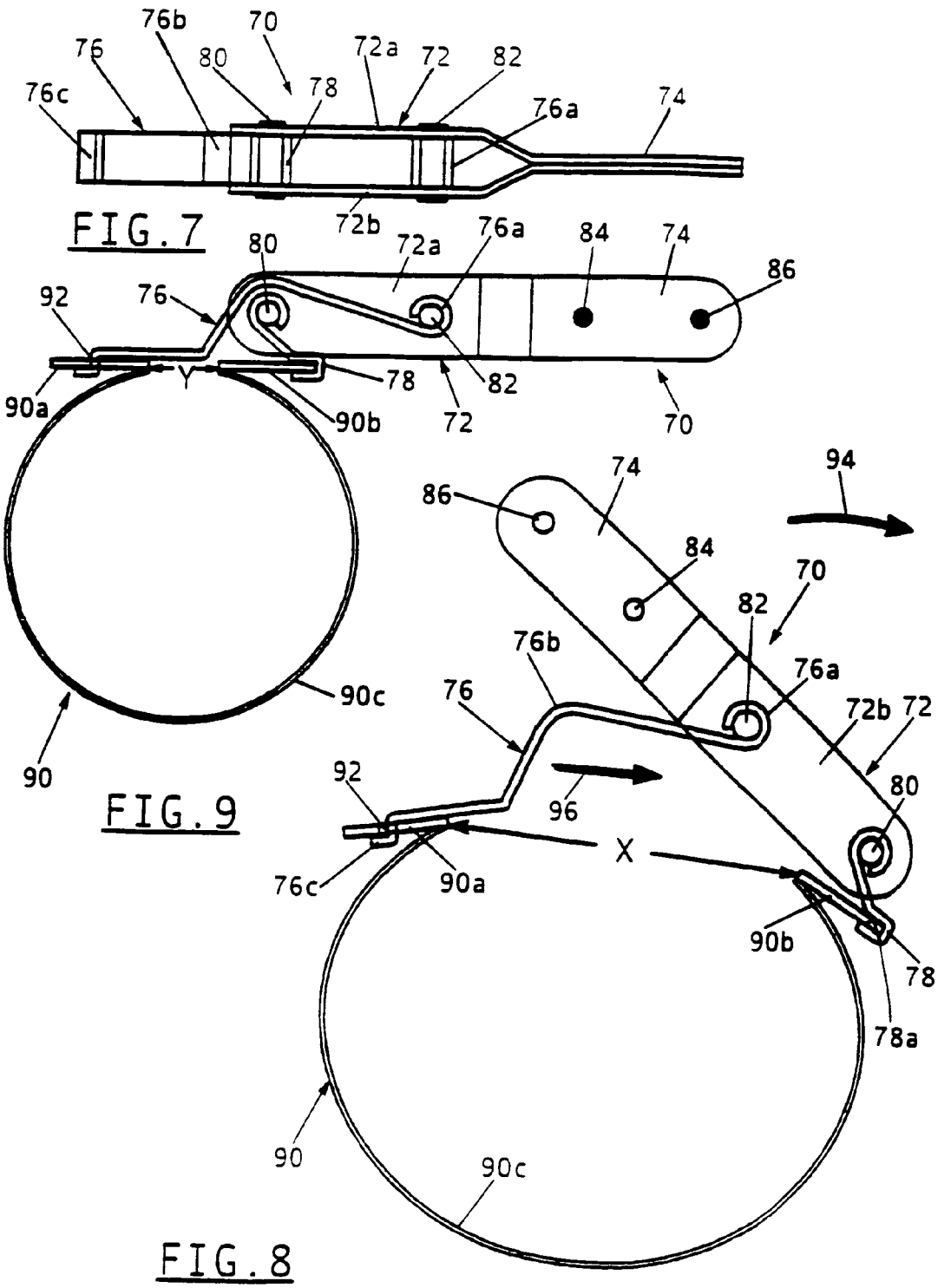

ADJUSTABLE PIPE REPAIR CLAMP INSTALLATION TOOL

CROSS REFERENCE TO RELATED APPLICATIONS

This application is a continuation-in-part of U.S. patent application Ser. No. 10/608,290 filed on Jun. 27, 2003, which is a continuation-in-part of U.S. patent application Ser. No. 10/393,820 filed on Mar. 21, 2003, which issued as U.S. Pat. No. 6,837,522 on Jan. 4, 2005.

FIELD OF THE INVENTION

This invention relates generally to fluid carrying conduits, or pipes, and is particularly directed to a leaking pipe and a tool for facilitating the positioning of a repair clamp on the pipe for sealing off the leak, wherein the tool includes an adjustable feature for accommodating pipes of various diameters.

BACKGROUND OF THE INVENTION

Fluid carrying pipes are subject to leakage caused by damage or deterioration over time. When the leak in the pipe is readily accessible, repairing the leak is fairly straightforward. However, when the leaking pipe is buried in the ground or is otherwise not readily accessible, it is frequently difficult not only to locate the leak, but to repair the pipe and seal off the leak.

Repairing a leaking pipe typically involves positioning a clamp over the leak. The clamp is slipped over the pipe and facing end portions of the clamp are tightly drawn together typically by nut and bolt combinations. The repair clamp is typically comprised of high strength steel and is frequently difficult to position on the pipe and draw the opposed ends of the clamp together so that the clamp is securely positioned on the pipe because of the tendency of the clamp ends to pull away from one another due to tension in the clamp. This task also typically involves positioning a gasket comprised of a suitable sealing material between the fluid-carrying pipe and the repair clamp. This task is frequently made extremely difficult by leakage of the fluid from the pipe and may even be highly dangerous when dealing with hazardous materials. In addition, because of the difficulty in excavating around the pipe without damaging the pipe, access to the leaking portion of the pipe is typically very restricted and this further complicates and renders more difficult the task. Finally, because of the leaking fluid, the underground location, and the structure of the repair clamp, the clamp installer is subject to injury.

The present invention addresses the difficulties encountered in the prior art by providing a manually operated tool which facilitates the positioning of a pipe repair clamp about a leaking pipe for sealing off the leak. The pipe repair clamp installation tool can be operated with the use of only one hand allowing the installer to use the other hand for proper positioning of the clamp on the pipe. Once the repair clamp is properly positioned on the pipe, the installation tool securely maintains the repair clamp in position over the leak allowing for the tightening of nut and bolt combinations which draw the clamp tightly about the pipe in sealing off the leak. The pipe repair clamp is adjustable to accommodate pipes of various diameters.

OBJECTS AND SUMMARY OF THE INVENTION

Accordingly, it is an object of the present invention to facilitate the secure positioning of a repair clamp on a leaking pipe allowing the clamp to be tightened to seal off the leak.

It is another object of the present invention to provide a tool which facilitates the positioning of a repair clamp on a leaking pipe and the tightening of the clamp over the leak to seal the pipe.

Yet another object of the present invention is to provide a manually operated tool which tightens a high strength repair clamp on a leaking pipe, allowing the clamp to be moved in position over the leak and securely tightened to seal off the leak, followed by removal of the tool from the clamp.

A further object of the present invention is to facilitate installation of a repair clamp on a leaking pipe where only limited access to the leak is available such as in an underground pipeline.

A still further object of the present invention is to provide an adjustable tool for installing a repair clamp on a pipe which is adapted for use with a wide range of repair clamp sizes and pipe diameters.

A still further object of the present invention is to provide for the installation of a repair clamp on leaking pipes having a range of diameters using a single adjustable clamp installation tool.

This invention contemplates apparatus for installing a repair clamp on a pipe, where the repair clamp includes a generally cylindrical body having first and second opposed edge flanges, a slot extending the length thereof for receiving the pipe and positioning the repair clamp about an outer circumference of the pipe, and plural nut and bolt combinations coupled to the clamp's edge flanges for drawing the repair clamp tightly about the pipe. The apparatus comprises a body portion having first and second opposed ends; an arm having a first end pivotally coupled to the body portion adjacent the first end thereof, the arm further including a second opposed end adapted for insertion in an aperture in the first edge flange of the repair clamp; a clasp pivotally coupled to the body portion intermediate the first and second opposed ends thereof and adapted to engage an outer edge of the repair clamp's second edge flange when the body portion is in a first position relative to the arm and clasp and the repair clamp is loosely disposed about the pipe, wherein pivoting displacement of the body portion about the arm and clasp to a second position draws the repair clamp's edge flanges together for securely maintaining the repair clamp on the pipe and allowing the nut and bolt combinations to be tightened for securing the repair clamp to the pipe in a sealed manner. The inventive installation tool is adjustable to accommodate the installation of a repair clamp on pipes having a wide range of diameters.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a perspective view of a pipe repair clamp installation tool in accordance with the principles of the present invention;

FIG. 2 is a top plan view of the pipe repair clamp installation tool shown in FIG. 1;

FIG. 3 is a side elevation view of the pipe repair clamp installation tool shown in FIG. 1;

FIG. 4 is an end-on view of the pipe repair clamp installation tool shown in FIG. 3 taken along sight line 4-4 therein;

FIG. 7 is a bottom plan view of another embodiment of a pipe repair clamp installation tool in accordance with the present invention;

FIG. 8 is a sectional view showing the manner in which the pipe repair clamp installation tool of the present invention engages first and second opposed edge flanges of a pipe repair clamp prior to the application of a clamping force by the tool on the clamp;

FIG. 9 is a sectional view showing the engagement of a pipe repair clamp by the pipe repair clamp installation tool of the present invention after the tool has been moved to the clamping position for maintaining the clamp securely in position on a leaking pipe;

DETAILED DESCRIPTION OF THE PREFERRED EMBODIMENTS

Figure 5:
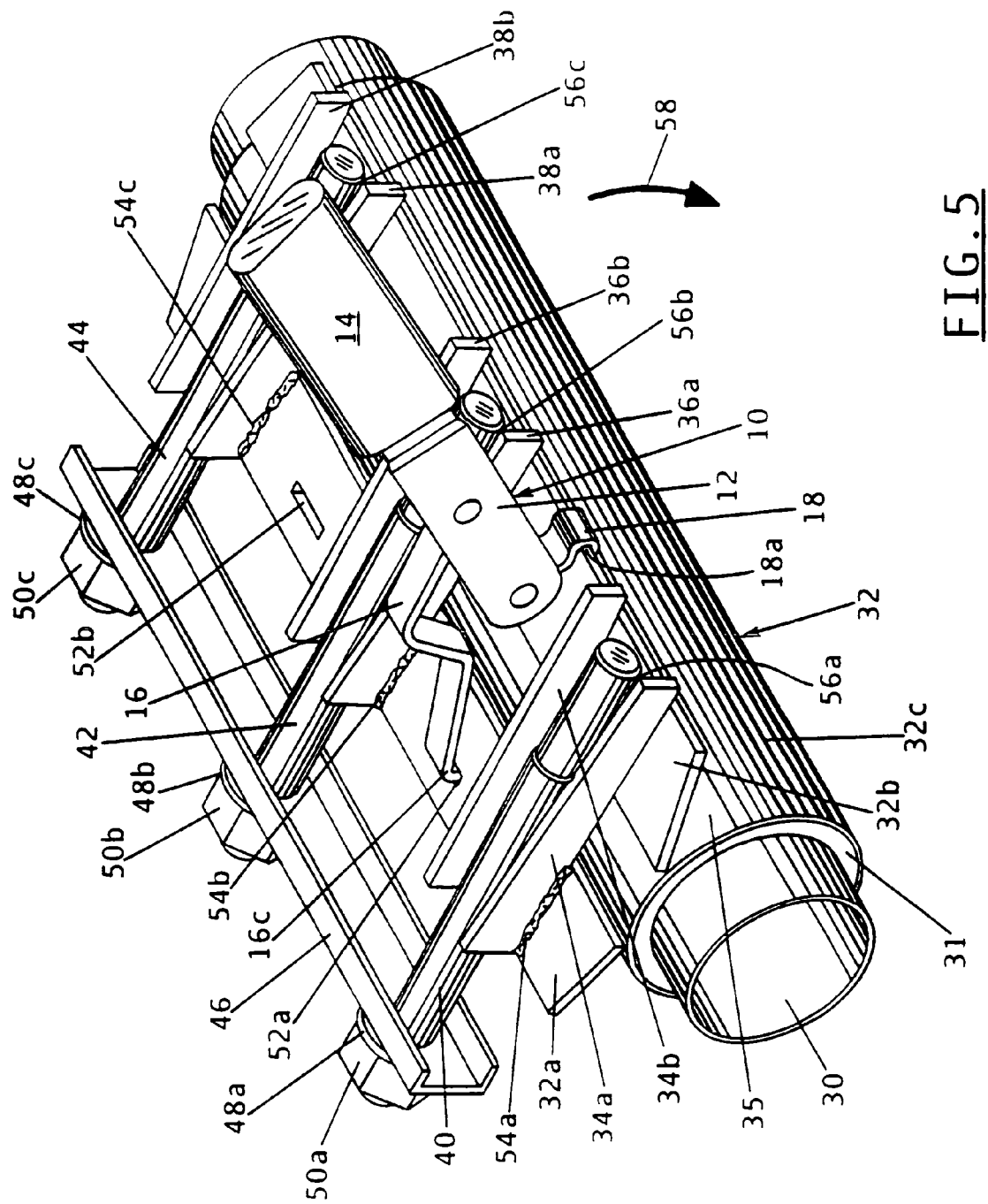
FIG. 5 is a perspective view showing the pipe repair clamp installation tool of the present invention engaging opposed edge flanges of a repair clamp positioned on a leaking pipe prior to moving the tool to the clamping position.

Referring to FIG. 1, there is shown a perspective view of one embodiment of a pipe repair clamp installation tool 10 in accordance with the principles of the present invention. A top plan view of the pipe repair clamp installation tool 10 is shown in FIG. 2, while a side elevation view of the pipe repair clamp installation tool is shown in FIG. 3. FIG. 4 is an end-on view of the pipe repair clamp installation tool 10 shown in FIG. 3 taken along sight line 4-4 therein.

The repair clamp installation tool 10 includes a central body 12 having disposed on one end thereof a handle 14. The central body 12 includes a pair of spaced, generally parallel arms 12a and 12b. Inserted through and extending between the first and second arms 12a and 12b of the central body 12 are first and second pivot/coupling pins 20 and 22. The first and second pivot/coupling pins 20 and 22 are securely connected to the central body's first and second arms 12a and 12b. The repair clamp installation tool 10 further includes a pivot arm 16 and an edge engaging clasp 18. Pivot arm 16 includes a clamp end 16a, a curved center portion 16b and a hook end 16c. The clamp end 16a of the pivot arm 16 is disposed about and attached to the second pivot/coupling pin 22. The pivot arm's clamp end 16a allows the pivot arm to freely pivot about the second pivot/coupling pin 22. An edge engaging clasp 18 is disposed about and pivotally coupled to the first pivot/coupling pin 20. In the configuration of the pipe repair clamp installation tool 10 shown in FIGS. 1-4, the curved center portion 16b of the pivot arm 16 is disposed upon a curved portion of the edge engaging clasp 18 which is disposed about the first pivot/coupling pin 20. The hook end 16c of the pivot arm 16 includes two 90° turns so as to form a step-like arrangement. As shown in FIG. 3, the distal end of the edge engaging clasp 18 includes a recessed slot 18a which is adapted to engage an outer edge of an edge flange of a repair clamp is described below. The tool's central body 12, pivot arm 16, edge engaging clasp 18, and first and second pivot/coupling pins 20, 22 are preferably comprised of high-strength steel. The tool's handle 14 is preferably comprised of rubber or an elastomeric material to facilitate manual gripping and manipulation. In the embodiment shown in FIGS. 1-4, the first and second arms 12a, 12b of the tool's central body 12 extend into and are securely coupled to the tool's handle 14.

Referring to FIG. 5, there is shown a perspective view of the inventive pipe repair clamp installation tool 10 and the manner in which it is used to secure a repair clamp 32 to a leaking pipe 30. Repair clamp 32 includes a generally cylindrical body portion 32c having first and second opposed edge flanges 32a and 32b extending the length of the repair clamp. Each of the first and second edge flanges 32a and 32b of the repair clamp 32 is generally flat and is formed integrally with the clamp's body portion 32c. Repair clamp 32 is shown disposed about a pipe 30, with a liner 31 positioned between and in contact with the outer surface of the pipe and the inner surface of the repair clamp. Repair clamp 32 does not extend fully around the circumference of pipe 30 and thus there is a gap between the clamp's first and second edge flanges 32a, 32b. Inserted between the liner 31 and adjacent portions of the inner surface of the clamp's body portion 32c and spanning the gap between the clamp's first and second edge flanges 32a, 32b is a clamp insert 35. Clamp insert 35 has generally the same curvature as the clamp's body portion 32c and extends the length of the repair clamp 32. The combination of the repair clamp's body portion 32c and the clamp insert 35 engages the liner 31 about its entire outer circumference and maintains the liner in intimate contact with the outer surface of the pipe 30 about the liner's entire inner circumference and length. Liner 31 preferably has an elastomeric composition or is comprised of rubber. The pipe repair clamp 32 is preferably comprised of a high strength, corrosion resistant steel. The width of the gap between the clamp's first and second edge flanges 32a and 32b is such that the repair clamp 32 may be easily slipped over the leaking pipe 30 being repaired. Thus, once the repair clamp 32 is disposed on the pipe 30, considerable force must be used to draw the opposed first and second edge flanges 32a, 32b of the repair clamp 32 toward one another to establish a sealed relationship between the liner 31 and repair clamp 32 combination and the inner fluid-carrying pipe. The inventive repair clamp 32 facilitates the application of this force in drawing the combination of the inner liner 31 and the inventive repair clamp 32 in contact with the outer surface of pipe 30 as described in the following paragraphs.

Figure 6:
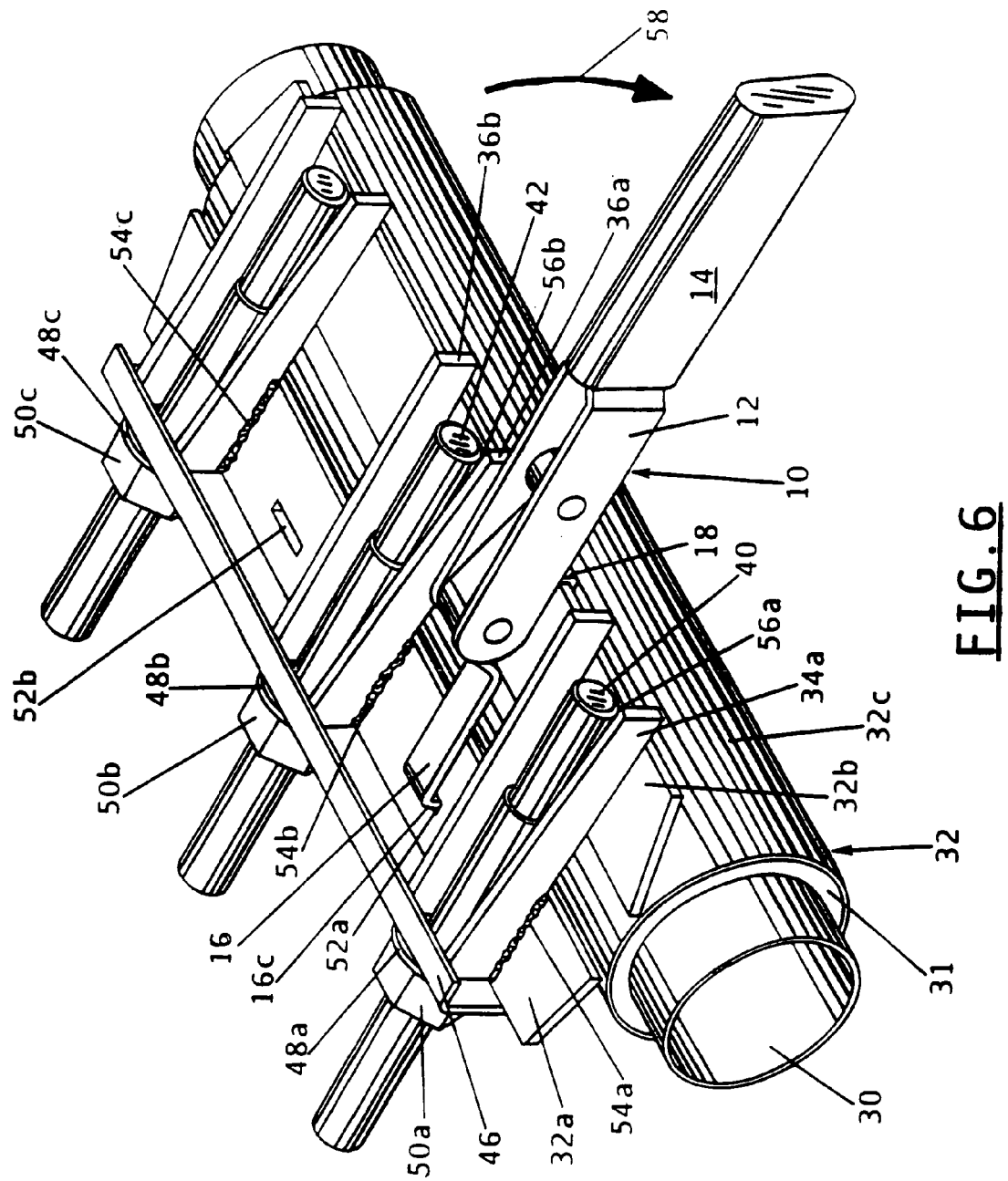
FIG. 6 is a perspective view of the pipe repair clamp installation tool of the present invention engaging opposed edge flanges of a pipe repair clamp disposed on a leaking pipe, with the installation tool moved to the clamping position for securely maintaining the repair clamp in position on the pipe.

Attached to the clamp's first edge flange 32a by means of respective weldments 54a is a first pair of ribs 34a and 34b. A second pair of ribs 36a and 36b is similarly attached to the clamp's first edge flange 32*a* by means of weldments 54*b*. Finally, a third pair of ribs 38*a* and 38*b* is securely attached to the clamp's first edge flange 32*a* by means of weldments 54*c*. Similarly, attached to the clamp's second edge flange 32*b* by means of weldments 56*a*, 56*b* and 56*c* are first, second and third bolts 40, 42 and 44. The first bolt 40 is aligned with and disposed between the first pair of ribs 34*a*, 34*b* which are attached to the clamp's first edge flange 32*a*. Similarly, the second and third bolts 42 and 44 are respectively disposed between and aligned with the second pair of ribs 36*a*, 36*b* and the third pair of ribs 38*a*, 38*b*. Each of the first, second and third bolts 40, 42 and 44 includes a distal threaded end portion which extends outwardly from the pair of spaced ribs between which the bolt is positioned. A clamping bracket 46 includes three spaced apertures each of which is adapted to receive the threaded end of one of the first, second and third bolts 40, 42 and 44. Each of the threaded end portions of the first, second and third bolts, 40, 42 and 44, is adapted to receive and engage a respective nut 50*a*, 50*b* and 50*c*. Tightening of the three nuts 50*a*, 50*b* and 50*c* on the three bolts 40, 42 and 44, respectively, moves the clamping bracket 46 towards the repair clamp 32 and into contact with the distal ends of the three pairs of ribs 32*a*, 32*b* and 36*a*, 36*b* and 38*a*, 38*b*, as shown in FIG. 6. Each of the paired ribs of the clamping bracket 46 and the three nuts 50*a*, 50*b* and 50*c* is preferably comprised of a high strength, corrosion-resistant steel, as are each of the three bolts 40, 42 and 44. Disposed between each of the three nuts 50*a*, 50*b* and 50*c* and the clamping bracket 46 is a respective nylon washer 48*a*, 48*b* and 48*c*.

As shown in FIG. 5, the clamp's first edge flange 32*a* is provided with first and second spaced slots, or eyes, 52*a* and 52*b*. Also as shown in FIG. 5, the hook end 16*c* of the repair clamp installation tool's pivot arm 16 is inserted within the first slot 52*a* within the clamp's first edge flange 32*a*. The pivot arm's hook end 16*c* could as easily be inserted within the second slot 52*b* within the repair clamp's first edge flange 32*a* for proper operation of the clamp as described below. With the hook end 16*c* of the clamp's pivot arm 16 inserted within the first slot 52*a* in the clamp's first edge flange 32*a*, a slot 18*a* in the repair clamp installation tool's edge engaging clasp 18 is positioned over and in contact with an outer edge of the repair clamp's second edge flange 32*b*. The distance between the first slot 52*a* and the outer edge of the clamp's second edge flange 32*b* depends upon the size of the clamp and the normal, unstressed distance between the clamp's first and second edge flanges 32*a* and 32*b*. The distance between the repair clamp installation tool's pivot arm hook end 16*c* and its edge engaging clasp 18 may be adjusted by the orientation of the tool's central body 12 relative to the pivot arm's hook edge and the tool's edge engaging clasp. For example, rotating the combination of the repair clamp installation tool's central body 12 and handle 14 in the direction of arrow 58 shown in FIG. 5 draws the pivot arm's hook end 16*c* and the tool's edge engaging clasp 18 toward one another. Similarly, rotation of the combination of the repair clamp installation tool's central body 12 and handle 14 in a direction opposite to that of arrow 58 will cause increased separation between the pivot arm's hook end 16*c* and the tool's edge engaging clasp 18 to provide increased spacing between the first and second edge flanges 32*a*, 32*b* of the repair clamp 32. Once in the position shown in FIG. 5, the repair clamp installation tool 10 will remain in this position because it is attached to the pipe clamps edge flanges 32*a*, 32*b*.

Referring to FIG. 6, there is shown a perspective view of the configuration of the repair clamp installation tool 10 for drawing the repair clamp's first and second edge flanges 32*a* and 32*b* toward one another for reducing the size of the gap between these edge flanges and securely positioning the repair clamp 32 on pipe 30. In FIG. 6, the repair clamp installation tool's central body 12 and handle 14 have been rotated in the direction of arrow 58 so as to be generally aligned with the tool's pivot arm 16. Rotation of the tool's central body 12 in the direction of arrow 58 reduces the separation between the pivot arm's hook end 16*c* and the tool's edge engaging clasp 18 so as to draw the repair clamp's first and second edge flanges 32*a*, 32*b* toward each other, reducing the gap between these two edge flanges. This draws the repair clamp 32 and inner liner 31 more tightly about pipe 30. With the repair clamp installation tool's central body 12 in general alignment with its pivot arm 16, the repair clamp installation tool 10 maintains the repair clamp 32 in compression about the inner liner 31 disposed on the pipe 30. The repair clamp installation tool's central body 12 will remain in the locked position shown in FIG. 6 without requiring the application of force to either the tool's central body 12 or its handle 14. This allows the repair clamp installer to use both hands, if necessary, to properly position the clamp's clamping bracket 46 on the three bolts 40, 42 and 44 and tighten the three nuts 50*a*, 50*b* respectively on bolts 40, 42 and 44. In order to release the repair clamp installation tool 10 from the repair clamp 32, the tool's body portion 32*c* and handle 14 must be moved in a direction opposite to that of arrow 58.

Referring to FIG. 7, there is shown a bottom plan view of another embodiment of a repair clamp installation tool 70 in accordance with the principles of the present invention. The repair clamp installation tool 70 includes a central body 72 having first and second connected arms 72*a* and 72*b*. Adjacent first ends of the first and second arms 72*a*, 72*b* form a handle 74. Adjacent a second end of the central body 72, the first and second arms 72*a*, 72*b* are arranged in a spaced manner and are connected together by means of first and second pivot/coupling pins 80 and 82. Repair clamp installation tool 70 further includes a pivot arm 76 having a first clamp end 76*a* disposed about and attached to the second pivot/coupling pin 82. A second, opposed end of the pivot arm 76 is provided with a hook 76*c*, while a curved center portion 76*b* of the pivot arm couples the clamp end 76*a* with the hook end. An edge engaging clasp 78 is disposed about and coupled to the first pivot/coupling pin 80 disposed on a second end of the tool's central body 72.

Referring to FIG. 8, there is shown a sectional view of the repair clamp installation tool 70 engaging a pipe repair clamp 90 in accordance with the present invention. The handle 74 of the repair clamp installation tool 70 is formed by connecting adjacent portions of the tool's arms by means of a pair of coupling pins, or rivets, 84 and 86. In addition, the hook end 76*c* of the tool's pivot arm 76 is inserted in a slot, or eye, 92 within a first edge flange 90*a* of a pipe repair clamp 90. Similarly, a slot 78*a* within the edge engaging clasp 78 engages the outer edge of the second edge flange 90*b* of the repair clamp 90. The repair clamp 90 further includes a generally cylindrical body portion 90*c* having the first and second edge flanges 90*a* and 90*b*. The orientation of the repair clamp installation tool 70 and relative position of its first and second pivot/coupling pins 80, 82 respectively coupled to the pivot arm 76 and the edge engaging clasp 78 shown in FIG. 8 is such as to maximize the distance "X" between the edge engaging clasp and the distal hook end 76*c* of the pivot arm. The orientation of the repair clamp installation tool 70 relative to the repair clamp 90 is such that the tool merely engages the first and second edge flanges 90*a*, 90*b* of the repair clamp without applying an inwardly directed force for drawing the two edge flanges together. In order to apply a compressive force by the repair clamp installation tool 70 to the repair clamp 90, the tool's central body 72 must be rotationally displaced about the second pivot/coupling pin 82 in the direction of arrow 94 shown in FIG. 8. This results in displacement of the repair clamp installation tool's pivot arm 76 in the direction of arrow 96 and a narrowing of the gap between the repair clamp's first and second edge flanges 90*a* and 90*b*.

Referring to FIG. 9, there is shown a longitudinal sectional view of the repair clamp installation tool 79 taken from the direction opposite to the sectional view of FIG. 8, wherein the repair clamp installation tool has been displaced to the pipe engaging position. In the arrangement shown in FIG. 9, the distance between the repair clamp's first and second edge flanges 90*a* and 90*b* has been reduced to a distance "Y", where Y<X, and the combination of the repair clamp 90 and a liner (not shown) securely engages the outer surface of a pipe (also not shown).

Figure 10:
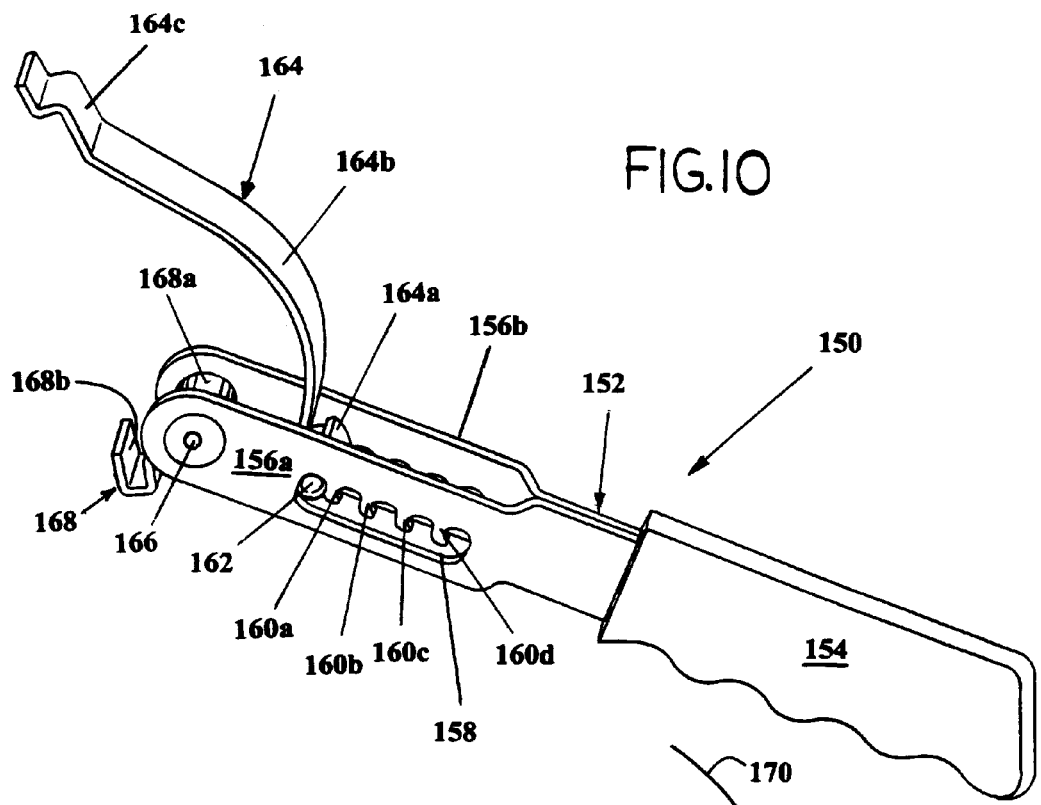
FIG. 10 is a perspective view of an adjustable pipe repair clamp in accordance with another aspect of the present invention.
Figure 11:
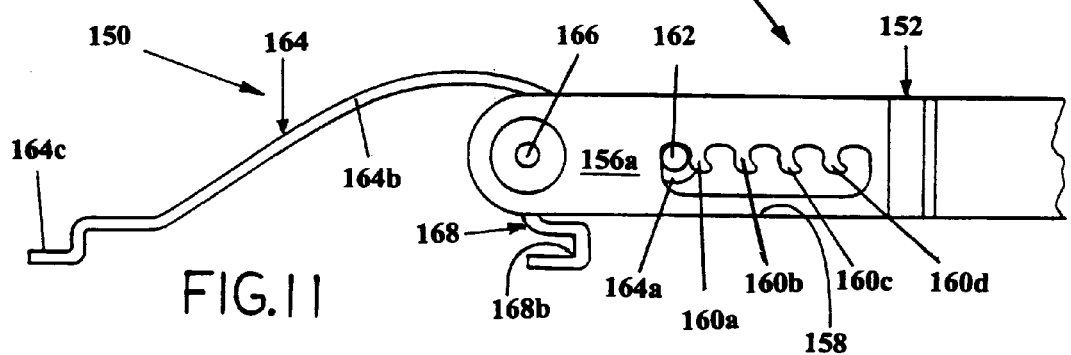
FIGS. 11 and 12 are side elevation views of the adjustable pipe repair clamp installation tool of FIG. 10 illustrating the manner in which the clamp is adjustable in size to accommodate a range of diameters of the pipe upon which the repair clamp is installed by the adjustable pipe repair clamp installation tool of the present invention.
Figure 12:
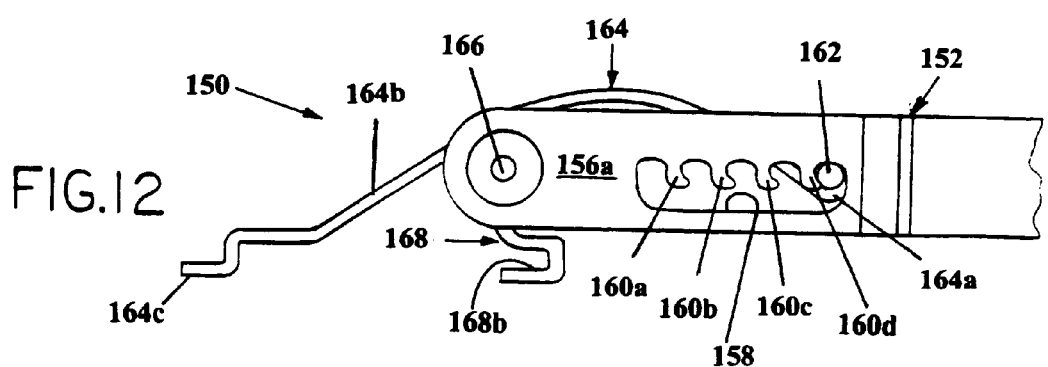

Referring to FIG. 10, there is shown a perspective view of another embodiment of a repair clamp installation tool 150 in accordance with the present invention which is adjustable to accommodate a range of diameters of the pipe upon which the repair clamp is installed. FIGS. 11 and 12 are side elevation views of the inventive adjustable repair clamp installation tool 150 shown in FIG. 10 illustrating the manner in which the size of the installation tool may be varied for installing a pipe repair clamp on pipes having a range of diameters. The adjustable repair clamp installation tool 150 includes an elongated, generally linear central body 152 preferably comprised of a high strength material such as steel. Disposed on a first end of the adjustable repair clamp installation tool 150 is a handle 154 preferably comprised of a material such as rubber or an elastomer to facilitate manual gripping of the adjustable repair clamp installation tool. Forming a second, opposed end of the adjustable repair clamp installation tool 150 are a pair of spaced, elongated, generally linear members 156*a* and 156*b*. Each of the first and second members 156*a*, 156*b* is aligned with the longitudinal axis of the adjustable repair clamp installation tool's central body 152. The first and second members 156*a*, 156*b* are preferably formed integrally with the tool's central body 152 to form a unitary structure. Disposed in each of the first and second members 156*a*, 156*b* is a respective elongated, linear slot 158 as shown in FIG. 10 for the first member 156*a*. Disposed within each of the elongated slots, as shown for elongated, linear slot 158, are plural curved ribs 160*a*-160*d*. Each of the curved ribs 160*a*-160*d* extends downwardly from an upper portion of slot 158 and is preferably formed integrally with the first member 156*a*. The slot in the second arm 156*b* is similarly provided with plural curved ribs extending downwardly from an upper portion of the slot, although this is not shown in the figures for simplicity.

Extending between the first and second members 156*a*, 156*b* and disposed within the respective elongated, linear slots in each of these members is a first pivot/coupling pin 162. The first pivot/coupling pin 162 includes a pair of opposed, flattened end portions so that the first pivot/coupling pin is maintained in position within the respective elongated, linear slots within the first and second members 156*a*, 156*b*. The spacing between adjacent curved ribs 160*a*-160*d* and between the two end ribs and an adjacent end of the elongated, linear slot 158 is such that the first pivot/coupling pin 162*a* snugly fits between a pair of adjacent curved ribs or between a curved rib and a curved end of the elongated, linear slot. The same is true of the first pivot/coupling pin within the elongated slot in the second member 156*b*. The first pivot/coupling pin 162 may be moved along the length of the elongated, linear slots by positioning the pin in lower portions of the parallel slots below the four curved ribs 160*a*-160*d* within the slots. The first pivot/coupling pin 162 is then moved upwardly so as to be positioned either between and in contact with a pair of adjacent curved ribs, or between one of the two end curved ribs 160*a* or 160*d* and an adjacent end of each of the elongated curvilinear slots. In this position, pin 162 is then engaged by either a pair of adjacent ribs or one of the end ribs and an end of the elongated curvilinear slot to maintain the pin securely in fixed position within the slots. After the repair clamp installation tool 150 is used in installing a clamp on a pipe, the first pivot/coupling pin 162 is then moved downwardly within the pair of elongated, linear slots and then along the length of the slots to change the position of the pivot/coupling pin within the aligned slots to accommodate the combination of a repair clamp and pipe of a different size.

Attached to the first pivot/coupling pin 162 is the clamp end 164*a* of a pivot arm 164. A second, opposed end of the pivot arm 164 is provided with a hook 164*c*. The clamp end 164*a* and hook end 164*c* are connected by means of a curved center portion 164*b* of the pivot arm 164. Pivot arm 164 is freely pivoting about the first pivot/coupling pin 162. As in the previously described embodiment, the hook end 164*c* of the pivot arm 164 is adapted for insertion in an elongated, linear slot within an edge flange of a pipe repair clamp (not shown for simplicity) for attaching the adjustable repair clamp installation tool 150 to a pipe repair clamp.

Attached to adjacent distal ends of the repair clamp installation tool's first and second members 156*a*, 156*b* is a second pivot/coupling pin 166. As in the case of the first pivot/coupling pin 162, the second pivot/coupling pin 166 is attached to the first and second members 156*a*, 156*b* by conventional means such as end caps or by deforming the ends of the pivot/coupling pin so that it is maintained in position within aligned apertures within the installation tool's first and second members. Disposed between the installation tool's first and second members 156*a*, 156*b* and about the second pivot/coupling pin 166 is a clamp end 168*a* of an edge engaging clasp 168. A second, opposed end of the edge engaging clasp 168 includes a recessed slot 168*b*. Recessed slot 168*b* is adapted for securely engaging an edge of a flange of a pipe repair clamp as previously described. Moving the handle 154 in the direction of arrow 170 in FIG. 11 toward the position shown in FIG. 11 draws the hook end 164*c* of pivot arm 164 and the recessed slot 168*b* of the edge engaging clasp 168 and the flanges of a repair clamp toward one another to the clamping position shown in FIGS. 11 and 12. In this position, the first and second edge flanges of a pipe repair clamp to which the pivot arm's hook end 164*c* and the edge engaging clasp's recessed slot 168*b* are respectively attached are drawn together and the pipe repair clamp is drawn tightly about the pipe to be repaired as previously described in terms of the first embodiment of this invention.

Referring specifically to FIGS. 11 and 12, the manner in which the size of the repair clamp installation tool 150 may be adjusted to accommodate a range of sizes of pipe repair clamps and pipe diameters will now be described. In FIG. 11, the first pivot/coupling pin 162 is disposed within slot 158 (and in the corresponding slot within the second arm 156*b*, which is not shown for simplicity) to provide maximum spacing between the hook end 164*c* of pivot arm 164 and the recessed slot 168*b* of edge engaging clasp 168. In this position, pin 162 is in the far left end of slot 158 as viewed in FIG. 11 to accommodate a pipe and repair clamp combination of large diameter. By moving pin 162 downward and out of contact with rib 160a, the pin may be displaced rightward along slot 158 as viewed in FIG. 11. When pin 162 reaches the right end of slot 158, the pin is moved upward and into contact with rib 160d as shown in FIG. 12 where it remains in position until urged downward. In this position, the spacing between the pivot arm's hook end 164c and the edge engaging clasp's recessed slot 168b is minimized to accommodate a pipe and repair clamp combination of smaller diameter.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for installing a repair clamp on a pipe, said repair clamp including a generally cylindrical body having first and second opposed edge flanges, a slot extending the length thereof for receiving the pipe and positioning said repair clamp about an outer circumference of the pipe, and plural nut and bolt combinations coupled to said edge flanges for drawing the repair clamp tightly about the pipe, said apparatus comprising:

a body portion having first and second opposed ends;

an arm having a first end pivotally coupled to said body portion intermediate the first and second opposed ends thereof, said arm further including a second opposed end adapted for insertion in an aperture in the first edge flange of the repair clamp;

a clasp pivotally coupled to said body portion adjacent the first end thereof and adapted to engage an outer edge of the repair clamp's second edge flange when said body portion is in a first position relative to said arm and clasp and the repair clamp is loosely disposed about the pipe, wherein said clasp includes a first end engaging the outer edge of the repair clamp's second edge flange and a second opposed end pivotally coupled to said body portion wherein the first end of said clasp includes a recessed slot adapted to receive the outer edge of the repair clamp's second edge flange, wherein pivoting displacement of said body portion about said arm and clasp to a second position draws the repair clamp's edge flanges together for securely maintaining the repair clamp on and in engagement with the pipe and allowing the nut and bolt combinations to be tightened for securing the repair clamp to the pipe in a sealed manner, wherein said arm and said clasp may be disengaged and removed from the edge flanges and the apparatus removed from the repair clamp following tightening of the nut and bolt combinations;

a first pivot pin coupling the second end of said clasp to said body portion;

a second pivot pin coupling the first end of said arm to said body portion;

an adjustable mechanism disposed in said body portion and coupling said arm to said body portion, wherein said adjustable mechanism includes at least one elongated slot disposed in said body portion and adapted to receive said second pivot pin and having plural engaging members disposed in a spaced manner along the length of said slot for engaging said second pivot pin for permitting spacing between the recessed slot of said clasp and the second end of said arm to be adjusted to accommodate a range of sizes of the repair clamp and diameters of the pipe, wherein each of said engaging members includes a curved recessed portion disposed between adjacent ribs for engaging and maintaining said second pivot pin in fixed position in said elongated slot in a releasable manner.

2. The apparatus of claim 1 wherein said body portion includes a pair of elongated slots each having plural engaging members disposed in a spaced manner along the length of each of said slots for engaging said second pivot pin for permitting spacing between the recessed slot of said clasp and the second end of said arm to be adjusted.

3. The apparatus of claim 2 wherein said body further includes first and second parallel, spaced, linear members each including a respective elongated slot having plural engaging members, and wherein said first pivot pin is disposed in the slots in said first and second members.

4. The apparatus of claim 3 wherein each of said elongated slots includes plural curved ribs arranged in spaced, linear alignment within the slot.

5. The apparatus of claim 1 wherein said clasp includes a hook disposed on the second end thereof and positioned about said first pivot pin.

6. The apparatus of claim 5 wherein the first and second spaced members of said body portion form a handle at respective first connected ends thereof.

7. The apparatus of claim 6 wherein second opposed ends of said first and second members are arranged in a spaced manner from each other and wherein said arm and said clasp are disposed between said first and second members adjacent the second ends thereof.

8. The apparatus of claim 7 wherein said first and second pivot pins are disposed between and coupled to said first and second members.

9. The apparatus of claim 8 wherein said adjustable mechanism further includes first and second elongated linear slots respectively disposed in said first and second members with each of said slots having plural engaging members disposed in a spaced manner along the respective lengths thereof, and wherein the engaging members in said first slot engage a first end of said second pivot pin and the engaging members in said second slot engage a second opposed end of said second pivot pin.

10. The apparatus of claim 1 wherein said arm and said clasp are disposed in closely spaced, aligned relation when said body portion is pivotally displaced to said second position.

11. The apparatus of claim 1 further comprising a handle disposed on the second end of said body portion.

12. The apparatus of claim 11 wherein said handle is comprised of rubber or an elastomeric material.

13. The apparatus of claim 1 wherein the second end of said arm includes a hook structure for insertion into the aperture when said body portion is in said first position, and wherein said hook structure cannot be removed from the aperture when said body portion is in said second position for locking the repair clamp in position on the pipe.

14. The apparatus of claim 13 wherein said aperture is in the form of a generally linear slot and said hook structure includes first and second coupled flat portions having approximately 90° relative orientation.

15. The apparatus of claim 1 wherein said clasp is generally C-shaped and includes an elongated slot for engaging an outer edge of the repair clamp's second edge flange.

16. The apparatus of claim 1 wherein said apparatus is comprised of high strength steel.

17. The apparatus of claim 1 further comprising first and second pins attached to said body portion for pivotally coupling said arm and clasp, respectively, to said body portion, and wherein said second pin forms an axis of rotation about which said body portion rotates when moved between said first and second positions.

18. The apparatus of claim 17 wherein said first and second pins and an end portion of said clasp engaging an outer edge of the repair clamp's second edge flange are in general linear alignment when said body portion is in said second position.

19. The apparatus of claim 18 wherein the body portion is pivotally displaced about said second pin in moving said body portion from said first to said second position in removing said apparatus from the repair clamp.

* * * * *